Figure 1:
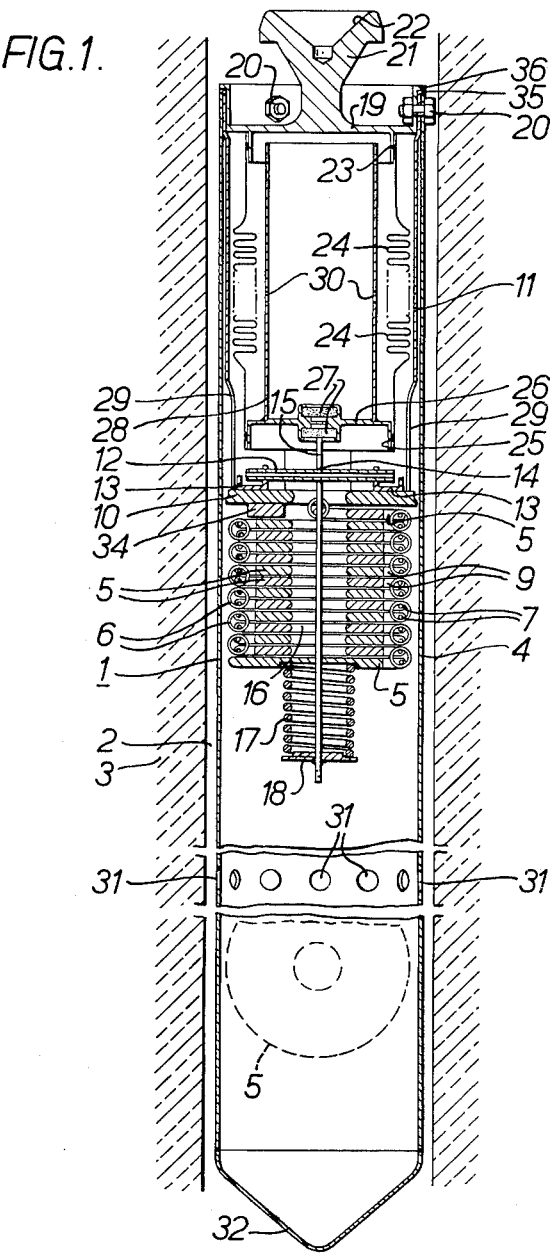

Oct. 19, 1965  W. P. WHITE ETAL  3,212,976
NUCLEAR REACTOR CONTROL DEVICES
Filed May 9, 1962  2 Sheets-Sheet 1

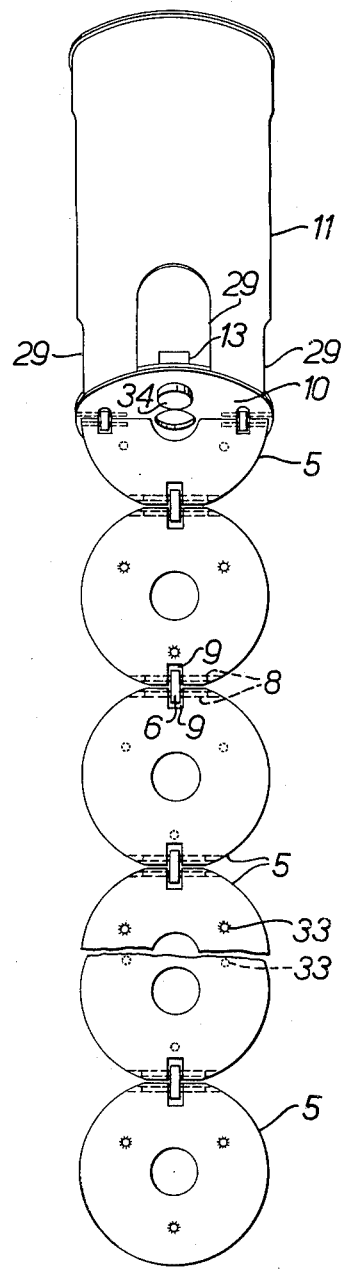

United States Patent Office 3,212,976
Patented Oct. 19, 1965

3,212,976
NUCLEAR REACTOR CONTROL DEVICES
William Paul White, Chester, and Keith Guy Eickhoff, Hale, England, assignors to United Kingdom Atomic Energy Authority, London, England
Filed May 9, 1962, Ser. No. 193,585
Claims priority, application Great Britain, May 17, 1961, 18,056/61
4 Claims. (Cl. 176—22)

This invention relates to control elements for nuclear reactors and it provides, in one form, a control element for a pressurised gas cooled nuclear reactor.

In nuclear reactor technology two forms of control are commonly used, namely normal operational control and emergency control. Normal operational control can be achieved by the kind of control element, usually in the form of a rod, which is made of high neutron absorbing material and is insertable into and withdrawable from the reactor core. This kind of element demands space around the core in which to accommodate the control rods when withdrawn from the reactor core. Further development led to the concept of a kind of control element having two or more rods to tubes of high neutron absorbing material positioned in the reactor core, the rods or tubes being capable of regulated relative movement by means of an actuating mechanism outside the core, the arrangement being such that regulated relative movement of the rods or tubes by the actuating mechanism varies the overlap between the rods or tubes and hence the control exerted by the element. Thus when the rods or tubes are in a position of maximum overlap the control exerted by the element is least due to the mutual shadowing of the members, whereas when the rods or tubes are moved to a position such that there is no overlap between them the control exerted by the element is at its maximum. It has also been suggested that a control element may be in the form of a coiled spring placed in a horizontal channel in the reactor core, operating members being connected to the ends of the spring and passing out of the reactor core at opposite sides thereof. Compression of the spring by the operating members reduces the effective length of neutron absorber and elongation of the spring by the operating members increases the effective length of neutron absorber.

Emergency control can be obtained by using shut-down rods of high neutron absorbing material which can be released from a position outside the reactor core to fall, or be projected, into the reactor core to bring about shut-down of the reactor. Following on from this there arose the idea of using ball shutdown systems in which balls of high neutron absorbing material normally stored in a hopper outside the core can be released to fall into the core to achieve shut-down.

Whilst these forms of emergency control are in general satisfactory there is the possibility, in the case of a pressurised gas cooled reactor, that a breach of the coolant circuit might give rise to disruptive forces leading to disarrangement or misalignment of the reactor core, thus preventing the shut-down rods or balls entering the core.

Other suggestions for emergency control include a can adapted to be placed within a nuclear reactor, the can containing an expandable bellows coated with a neutron poison compound. The bellows is expanded to give an increased neutron absorbing surface by the action of a compressed gas released by the melting of a solder plug at a given increased neutron flux by a uranium powered heater. Alternatively the can may contain concentric telescopic tubes held in the telescoped position against the force of a coil spring by solder connections. At a given increased neutron flux level the heater melts the solder connections and the spring expands the tubes.

The present invention is chiefly concerned with emergency control and as an indication of the type of nuclear reactor in which the invention may be used, attention is directed to the article "A.G.R." in "Nuclear Engineering," April 1961.

The invention provides a control element for insertion in a vertical channel of a core of a nuclear reactor, the element comprising discrete bodies of neutron absorbing material strung together to form a freely flexible chain whereby the element is retainable in a compact folded form.

More particularly the invention provides a control element for installation in a vertical channel of a core of a nuclear reactor, the element comprising a container housing a number of freely linked bodies of neutron absorbing material, each body having an aperture for passage of a retaining member to hold the bodies in a compact folded form, and means for ejecting the retaining member whereby the bodies fall under gravity to a dispersed position of increased neutron absorption capacity.

The invention also resides in a control element installed in a vertical channel of a core of a nuclear reactor, the element comprising a container a number of freely linked bodies of neutron absorbing material, each body having an aperture for passage of a retaining member to hold the bodies in a compact folded form, and means for ejecting the retaining member through the apertures whereby the bodies fall under gravity to a dispersed position of increased neutron absorption capacity.

The bodies may be in the form of plates loosely hinged together or hollow cones interconnected by non-pivotal links such as flexible wires.

An embodiment of the invention will now be described with reference to the accompanying drawings in which:
 FIGURE 1 is a sectional elevation, and
 FIGURE 2 is a perspective view.

The drawings show in FIGURE 1 a nuclear reactor control element 1 installed in a vertical channel 2 in a graphite moderated core 3 of a pressurised gas cooled nuclear reactor. The element 1 comprises a tubular container 4 housing a number of freely linked discrete bodies of neutron absorbing material in the form of flat annular plates 5 or boron steel having a large absorption cross-section for thermal neutrons. The plates 5 are freely linked by being loosely hinged together by small rings 6, each ring 6 encircling two pins 7. Thus considering the linking of two adjacent plates 5, one of the two pins 7 encircled by the ring 6 is located in a hole 8 and traverses a slot 9 in one of the plates 5. Similarly the other pin 7 encircled by the ring 6 is located in a similar hole 8 and traverses a similar slot 9 in the other plate 5. The plates 5 are thus strung together to form a freely flexible chain and are linked alternately at diametrically opposite positions. In this way the plates 5 are retainable in a compact folded form with one plate 5 flat upon another. The uppermost plate 5 is of half annular form and is loosely hinged at two diametrically opposed points by rings 6 and pins 7 to an annular bottom end plate 10 welded to a tube 11. A frangible member in the form of a ceramic (sintered alumina) tube 12 is located horizontally in the upper end region of the container 4, the ends of the tube 12 resting in diametrically opposed support brackets 13 secured to the upper face of the plate 10. The tube 12 passes through a hole 14 in the upper end of a retaining member in the form of a vertical rod 15 which passes through a central hole 16 formed by the individual apertures of the annular plates 5. A coil spring 17 in compression is positioned between the lowest plate 5 and a horizontal flange plate 18 welded to the lower end of the rod 15.

The container 4 has an upper end cap 19 secured to the container 4 and the tube 11 by bolts 20. The cap 19 has a central upstanding part 21 having a conical recess 22, and the cap 19 also has a downwardly projecting annular flange 23. Pressure sensitive means in the form of a cylindrical flexible bellows 24 is sealed at its upper end to the flange 23 and at its lower end to a flange 25 on an annular plate 26. The plate 26 carries two porous plugs 27 and a tube 28 sealed at its lower end to the plate 26. The upper end of the tube 28 extends freely into the recess formed by the flange 23. The tube 11 has four equi-spaced ports 29 in the region of the plugs 27 and the tube 28 has equi-spaced ports 30. The container 4 has a ring of equi-spaced ports 31 and a lower conical welded end cap 32. The plates 5 have raised locating pips 33 and the plate 10 has a locating boss 34. The tube 11 has a locating flange 35 and the end cap 19 has a locating flange 36.

In assembling the element 1, the plates 5 and rings 6 are arranged together with the plate 10 welded to the tube 11 as shown in FIGURE 2. The pins 7 are then inserted in the holes 8 and the plates 5 peened over at the ends of the holes 8 to secure the pins 7 in position, the uppermost plate 5 being similarly hinged to the plate 10. Starting with the bottom plate 5, the plates 5 are then folded up from alternate sides of the folded compact form shown in FIGURE 1, the pips 33 always being on the upper side of the folded plates 5. The spring 17 and rod 15 with its welded plate 18 are then inserted through the hole 16 from the underside of the folded plates 5, and the ceramic tube 12 is then inserted through one of the ports 29 and through the hole 14 in the rod 15, the ends of the tube 12 resting in the brackets 13. The tube 12 has a central circumferential groove of V-section formed in its outer wall and the hole 14 in the rod 15 has its bounding wall formed in V-section so that the rod 15 sits centrally in the groove in the tube 12. The assembly of parts 5, 6, 7, 10, 11, 12, 13, 15, 17 and 18 is then inserted into the upper end of the container 4 until the flange 35 locates on the upper end edge of the container 4. The end cap 19 carrying the bellows 24, plate 26, plugs 27 and plate 28 is then inserted and positioned so that the underface of the bottom plug 27 contacts the top end of the rod 15 with the bellows 24 slightly compressed, and the bolts 20 are then inserted and tightened.

The end plate 19 with its conical recess 22, and the conical end cap 32 enable the element 1 to be stacked with other similar elements one upon another in the channel 2, there being typically six elements per channel.

In normal reactor operation the pressure inside the bellows 24 is the same as the pressure of the coolant gas in the channel 2, gas communication between the channel 2 and the inside of the bellows 24 being by way of the ports 31, the ports 29 and the plugs 27, the ports 30 and the open upper end of the tube 28. The bellows 24 is not affected by slow changes of coolant pressure in the channel 2 since the pressure inside the bellows 24 is balanced by gas flow through the porous plugs 27. Should a sudden drop in pressure in the channel 2 occur (such as in the event of a breach in the coolant circuit) a significant pressure differential then exits across the bellows 24 due to the restriction to gas flow provided by the plugs 27. The bellows 24 then expands and exerts a thrust on the rod 15 thus causing the tube 12 to break or fracture, when the force of the spring 17 ejects the rod 15 to the bottom of the container 4 and the plates 5 immediately fall under gravity to a dispersed position providing an increased neutron absorption capacity. The dispersed position of the plates 5 corresponds to that shown in FIGURE 2, and the position of the lowermost plate 5 in the dispersed position is indicated in dotted outline in FIGURE 1.

Sufficient channels 2 in the reactor are provided with the elements 1 so that the increased neutron absorption capacity of the plates 5 in their dispersed position brings about shut-down of the reactor, there being typically 12 to 18 plates per element.

Typical operating figures are as follows:
Pre-setload of compressed spring 17 is 7.5 lbs.
Tube 12 fractures under load of 25 to 30 lbs.
Thus effort required through bellows 24 to fracture tube 12 is 17.5 to 22.5 lbs.
Pre-set load of compressed bellows 24 is 2.5 lbs.
Thus pressure load required to fracture tube 12 is 15 to 20 lbs.
Effective area of bellows 24 is 3.3 square inches.
Thus differential pressure required across bellows 24 to operate the element 1 is 4.5 to 6 lbs./sq. inch.

The element 1 has particular advantage in that it provides a high "magnification factor," a fast operating time and a high standard of reliability. The magnification factor (ratio of effective neutron absorption surface area in the dispersed position to that in the compact position) depends upon the number and dimensions of the plates 5. For thirteen 3" diameter by ⅛" thick plates a magnification factor exceeding 5:1 is obtained. The fast operating time is readily appreciated when it is observed that the time for the plates 5 to fall from the compact folded form to the dispersed position is less than half a second. The high standard of reliability results partly from the fact that the element 1 is installed wholly within the core 3 and needs no external operating mechanism. The loose hinging of the plates 5 gives low friction enabling the plates 5 to fall with approximately gravitational acceleration.

The tube 12, spring 17, bellows 24, plate 26 and lower plug 27 provide means for ejecting the rod 15 through the hole 16 whereby the plates 5 fall under gravity to the dispersed position of increased neutron absorption capacity. It has been found that utilising the low frictional characteristics of the freely linked plates 5 and approximately gravitational acceleration of the plates 5 from the compact folded form to the dispersed position gives the element 1 a high degree of reliability for emergency control purposes without the need for a positive drive mechanism for dispersal, such as a spring or pressurised gas release system. Furthermore, the plates 5 do not rely on sliding contact for dispersal and hence the risk of jamming due to thermal expansion or irradiation growth is avoided.

The spring 17 as well as assisting rapid ejection of the rod 15 when the ceramic tube 12 is broken also limits the loading upon the tube 12 when the plates 5 are in the compact position so that the risk of spurious operation, due to vibration, is reduced.

The bellows 24 may be replaced by a disc of graphite or other suitable material arranged so that the centre of the disc shears out at a predetermined pressure differential and falls to strike the retaining rod and thus break the ceramic tube.

Alternatively, the bellows 24 may be replaced by temperature sensitive means such as for example a fissile heater in conjunction with a meltable fuse holding a weight so that on excessive temperature rise such as may follow from a breach in the coolant circuit the fissile heater melts the fuse and the weight then falls to strike the retaining rod 15 and break the ceramic tube 12.

The formation of a groove of V-section in the outer wall of the tube 12 helps to localise the position of initial fracture and to provide an unobstructed ejection of the retaining rod 15.

An indication of operation of the element 1 may be obtained by using an insert of e.g. silver foil in the inside of the tube 12. Electrical leads are taken from each end of the foil to a detector circuit such that when the tube 12 is fractured or broken and the rod 15 ejected, the foil is also broken so that the circuit is broken to give an indication of the operation of the element 1.

In the element 1 described above, the plates 5 are made of boron steel whilst the other components (apart from the ceramic tube 12) are made of stainless steel (the plugs 27 are made of sintered stainless steel powder). The materials of construction are of significance in that whilst a high magnification factor is desirable for shutdown purposes, there should not be undue neutron flux distortion due to the presence of the elements 1 during normal reactor operation. Thus an element 1 having plates 5 of stainless steel and the other components (apart from the ceramic tube 12) also made of stainless steel gives less neutron flux distortion but a smaller magnification factor than an element 1 having plates 5 of boron steel and the other components (excluding the ceramic tube 12) made of zirconium, whilst the combination of boron steel plates 5 with the other components generally of stainless steel as described for the element 1 of the drawings represents an intermediate selection.

Instead of the plates 5, the linked bodies may be in the form of discrete hollow cones interconnected with non-pivotal links such as flexible wires, the cones nesting together in the compact position.

We claim:

1. A control element for installation in a vertical channel of a core of a nuclear reactor, the element comprising a container housing a number of freely linked bodies of neutron absorbing material, each body having an aperture for passage of a retaining member common to all the bodies to hold the bodies in a compact form, and means for ejecting the retaining member whereby the bodies fall under gravity to a dispersed position of increased neutron absorption capacity, said means including a frangible member for locating said retaining member, and a thrust member for rupturing said frangible member.

2. In a vertical channel in a gas cooled nuclear reactor core, a control element comprising a vented container, a number of freely linked bodies of neutron absorbing material housed in the container, each body having an aperture for passage of a retaining member common to all the bodies to hold the bodies in a compact form, and means for ejecting the retaining member through the apertures whereby the bodies fall under gravity to a dispersed position of increased neutron absorption capacity, said means including a frangible member for locating said retaining member, and a bellows with a gas flow restrictor, whereby a sudden drop in pressure of said gas in said channel causes said bellows to expand to rupture said frangible member.

3. A control element as claimed in claim 2, wherein the bodies are in the form of annular plates, an intermediate plate being linked to two other plates at diametrically opposite positions, thereby enabling the plates to be folded flat one upon another in compact form.

4. A control element for installation in a vertical channel of a core of a nuclear reactor, the element comprising a container, a number of disc-like bodies of neutron absorbing material linked one to another to form a flexible chain housed in and supported at one end from the container and respectively defining apertures in alignment on a common axis when said bodies are in a compact folded form, a retaining member supportable from the container and insertable through the aligned apertures to retain the compact folded form of the bodies, and means for ejecting the retaining member whereby the bodies fall under gravity to a dispersed position of increased neutron absorption capacity.

References Cited by the Examiner

UNITED STATES PATENTS 2,905,612  9/59  Borst _____ 176—34

FOREIGN PATENTS 1,195,014  11/59  France.

CARL D. QUARFORTH, *Primary Examiner.*

REUBEN EPSTEIN, *Examiner.*